Figure 1:
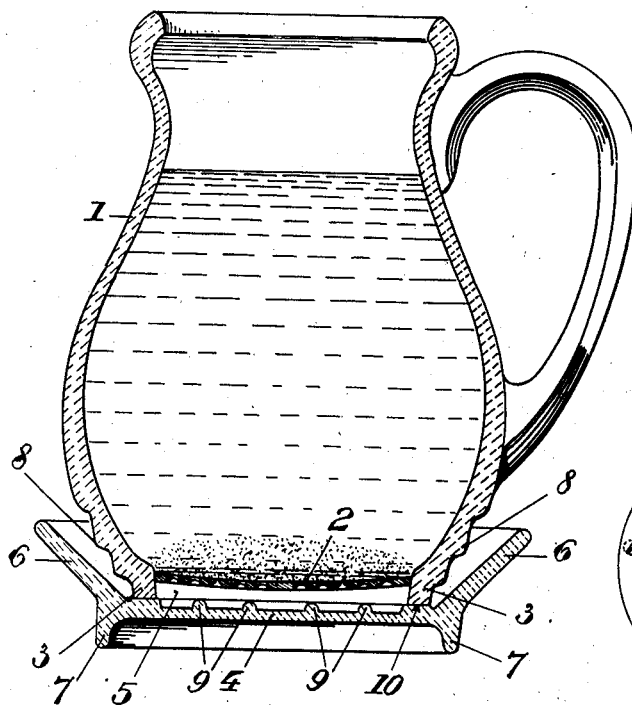

March 26, 1929.  C. A. BÜTTNER  1,706,771
COFFEE PERCOLATOR
Filed July 27, 1928

Inventor:
C. A. Büttner
By Marks & Clerk
Attys.

Patented Mar. 26, 1929.

1,706,771

UNITED STATES PATENT OFFICE.

CARL ARTUR BÜTTNER, OF BERLIN, GERMANY.

COFFEE PERCOLATOR.

Application filed July 27, 1928, Serial No. 295,768, and in Germany November 9, 1926.

This invention relates to coffee percolators which essentially consist of an upper member made from some ceramic material, preferably porcelain, and provided with a perforated bottom or sieve and a properly formed under member upon which said upper member may be placed during the operation of percolating. In order to operate the percolator the ground coffee is poured into said upper member in such a way that said coffee will cover-up said perforated bottom or sieve, and hot water is thereupon passed over said ground coffee. The percolator according to my invention does not employ any kind of special filter, such as a paper, texture or the like, the layer of ground coffee which swells up during the passage of hot water solely serving as a filter in the well-known manner.

A special feature of my invention lies in the fact that the upper member of the percolator is provided at its under surface with an edge which slightly projects beyond the perforated bottom or sieve, said edge being smoothly ground and exactly fitting a correspondingly shaped smooth surface provided on the imperforate cup-shaped under member of the percolator. Thus a closed air-space will be provided intermediate said perforated bottom or sieve and said under member during passage of the hot water through the ground coffee, said water passing gradually from above into said space. The heated air which discharges from said space will be forced to pass through the layer of ground coffee during passage of the water therethrough, thereby whirling-up the particles of ground coffee. The latter will therefore be prevented against forming a hard layer and clogging-up the perforations of said perforated bottom or sieve.

In order to secure a proper fit between the contacting surfaces of the upper and under members of the percolator, said under member likewise is preferably made of ceramic material such as porcelain, and provided with a smoothly ground contacting surface. In like manner the under edge of the upper member of the percolator is provided with a smoothly ground surface adapted to form a proper contact with said former surface. In this way an almost liquid-tight closure will be provided between said upper and under members. When pouring-in the water a small quantity of water mixed with coffee-powder will first pass to the under member of the percolator and after a short time the fine coffee-particles which had been carried with the water through the larger perforations of the perforated bottom or sieve into the space intermediate said bottom or sieve and the under member of the percolator will provide a completely hermetic closure between the upper and under members so that the quantity of liquid resting on the under member will not further be increased during continuation of the percolating process. Since the rim of the under member is bent upwardly to impart the shape of a cup or container thereto the entire quantity of discharging liquid may be taken up by said cup or container.

Immediately after hot water has been passed through the coffee-powder, the under member of the percolator is withdrawn and the upper member may now be placed upon a coffee-pot. In order to easily adapt said upper member of the percolator to fit coffee-pots of different sizes, it is provided at the under portion of its bilge with a plurality of stepped grooves forming annular supporting surfaces positioned at different heights and of a diameter corresponding to different diameters of the aperture of a coffee-pot. On account of the loose consistency of the coffee-powder, the liquid coffee will now flow-off very quickly through the ground coffee into the coffee-pot. The process of filtration will essentially be accelerated when employing a perforated bottom or sieve of a form slightly sloping towards its center. In order to further accelerate the process of filtration the perforations which are provided in the perforated bottom or sieve consist of slotted portions on the upper surface, said slotted portions merging into funnel-shaped portions towards the under side of said perforated bottom or sieve. The small quantities of liquid and coffee-powder which have remained after filtration on the under member of the percolator may now be poured back into the upper member. At the same time a part of the fine coffee-powder will be retained by action of the concentrical grooves which are formed on the upper surface of the under member intermediate the concentrical projections thereon. These grooves are surrounded by the above-mentioned smoothly ground contact surface between the under and upper members of the percolator.

The under member of the percolator is provided on its under surface with an annularly shaped projecting rim, the interior diameter of said rim being larger than the diameter of the upper edge of the upper member of the percolator. The under member, therefore, may be placed as a cover upon the upper member after the filtering process in order to prevent cooling-off of the coffee. The upper member of the percolator is of a form tapering towards above. In consequence of this tapering form the ground coffee will be more easily wetted by the hot water during the process of percolating, this being due to the fact that during swelling-up the ground coffee will be moved towards the tapering wall of the upper member of the percolator; during discharge of the liquid therefore the fatty substances contained therein will be prevented from depositing on the walls of the upper member.

The entire apparatus may be cleaned after use in a very simple manner by merely washing or rinsing the upper as well as the under member in cold water. The liquid coffee delivered by the percolator according to my invention will be of perfect clearness and excellent taste. This is due in the first place to the fact that the coffeee during the process of percolating will only come in contact with ceramic material.

In the second place the fatty and frequently rancid constituents of the coffee-powder will be prevented from passing into the liquid coffee. These constituents prior to being filtered will float upon the surface of the liquid coffee within the upper member of the percolator and owing to its specific construction will be effectively retained within the coffee-powder during discharging of the liquid coffee.

Figure 3:
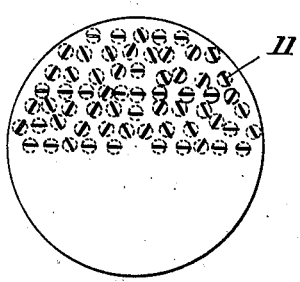
Figure 4:
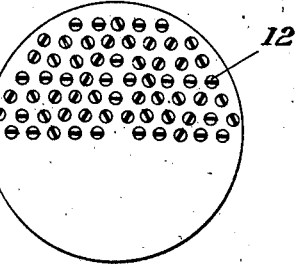

A percolator constructed according to my invention is represented in the accompanying drawing which forms part of this specification. In the drawing, Fig. 1 is a vertical section through a percolator according to my invention, said percolator comprising an under member, an upper member and a sieve, Fig. 2 a top-view of the under member of the percolator with the upper member removed, and Figs. 3 and 4 are a top-view and bottom-view, respectively, of the sieve or perforated bottom of the percolator according to my invention.

Referring now more particularly to the drawing, the upper member of the percolator tapers towards above and is designated with the reference numeral 1 in Fig. 1 of the drawing. The sieve or perforated bottom provided on said upper member is designated with the reference numeral 2 and the under rim of the upper member of the percolator with the reference numeral 3. The cup or under member 4 of the percolator is provided at the place where it comes in contact with the under edge of the upper member with a smoothly ground contact surface 10. The outermost part of the rim of the under member is bent upward to form a cup or container, while on the underside said under member carries an annular projection 7. The space intermediate the perforated bottom or sieve 2 is designated with the reference numeral 5, while the grooves which are provided at different heights of the under portion of the bilge of the upper member 1 are designated with the reference numeral 8.

Figure 2:
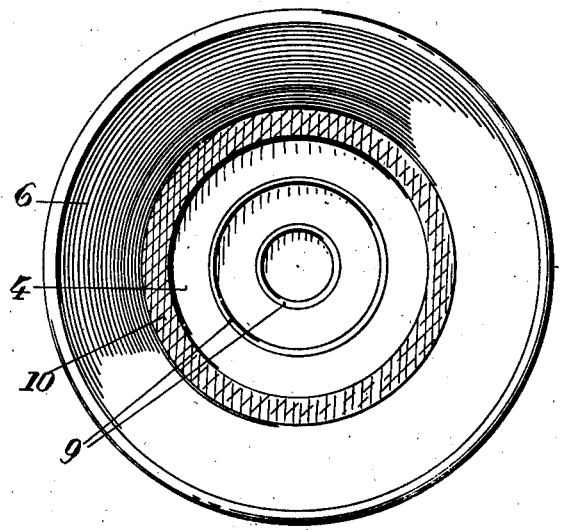

Fig. 2 shows the cup-shaped under member 4 of the percolator together with the annular projections 9 as well as the smoothly ground annular surface 10 which projections and annular surface are likewise represented in Fig. 1. The several perforations of the perforated bottom or sieve 2 as shown in Fig. 3, consist of narrow slots 11 which merge towards below into funnel-shaped enlargements. In Fig. 4 the lower funnel-shaped portions of the perforations are indicated at 12.

It is known to construct coffee-percolators with a second bottom provided below the perforated bottom or sieve, said second bottom, however, being likewise perforated. When using this kind of sieves, the fine coffee-powder will easily pass into the coffee-pot. If on the other hand the perforations in the said second bottom are made very fine in order to prevent passage of the fine coffee-powder the filtering process will become extremely slow. Besides, the filtering in this case will commence immediately with the percolating operation proper and the liquid coffee, therefore, will have no sufficient time to set quietly and to prevent the fatty constituents from passing to the surface of the liquid coffee. With these constructions of percolators, therefore, small quantities of fatty constituents of notoriously bad taste will always be present in the liquid coffee after filtering.

The coffee-percolator according to my invention is superior to all devices of this class heretofore constructed or proposed. In the first place the process of filtration in my percolator will be essentially accelerated and in the second place the quality of the coffee will be considerably improved, as the coffee prepared by my percolator will be quite clear and fully free of the undesirable fatty constituents. In addition to this, a further advantageous feature of my new percolator consists in the ease and convenience with which it may be handled and cleaned. The percolator according to my invention further favorably distinguishes from known devices of this kind in that a tight closure is provided for the first time between the upper member and the imperforate under member, said tight closure essentially serving to enhance the quality of the coffee prepared with the percolator according to my invention.

I claim:

1. A coffee-percolator comprising an upper member, a perforated body therein, both of ceramic material, an imperforate under member, a rim provided on the under surface of said upper member, a smoothly ground surface on said rim, a similar smoothly ground surface on said under member, said surfaces being adapted to contact with each other so as to form a closed air-filled space intermediate said perforated bottom and said under member.

2. A coffee-percolator as specified by claim 1, having plane contacting surfaces on the under and upper members, said under member being likewise of ceramic material.

3. A coffee-percolator as specified by claim 1, having an upper member of a form tapering towards above, thus facilitating the wetting of the ground coffee during the process of percolating, at the same time preventing fatty constituents of the ground coffee depositing on the walls of said upper member during passage of the coffee through the percolator.

4. A coffee-percolator as specified by claim 1, having a bilged upper member, and grooves at a different height on the under portion of the bilge-shaped outer surface of said upper member, said grooves being adapted to form supporting surfaces permitting the placing of said upper member on a coffee-pot or the like.

5. A coffee-percolator as specified by claim 1, having an under cup-shaped member, said cup-shaped under member comprising an upwardly bent outer rim.

6. A coffee-percolator as specified by claim 1, having an under member which is provided with concentrical annular projections and concentrical annular grooves therebetween.

7. A coffee-percolator as specified by claim 1, in which the rim on the upper member is of annular conformation, the interior diameter of said rim being larger than the diameter of the upper edge of the upper member, thus permitting said under-member to form a cover for said upper member.

8. A coffee-percolator as specified by claim 1, having a perforated bottom in which the perforations consist of slots on the upper surface of said bottom and funnel-shaped enlargements towards the underside of said bottom.

In testimony whereof I affix my signature.

CARL ARTUR BÜTTNER.